A. G. TULANE.
LAWN MOWER ATTACHMENT.
APPLICATION FILED APR. 21, 1911.

1,005,086.

Patented Oct. 3, 1911.

Witnesses:
C. E. Wessels.
A. A. Olson.

Inventor:
Azel G. Tulane,
By his Attorney.

COLUMBIA PLANOGRAPH CO., WASHINGTON, D. C.

UNITED STATES PATENT OFFICE.

AXEL G. TULANE, OF CHICAGO, ILLINOIS.

LAWN-MOWER ATTACHMENT.

1,005,086. Specification of Letters Patent. Patented Oct. 3, 1911.

Application filed April 21, 1911. Serial No. 622,569.

*To all whom it may concern:*

Be it known that I, AXEL G. TULANE, a subject of the King of Sweden, and a resident of the city of Chicago, county of Cook, and State of Illinois, have invented certain new and useful Improvements in Lawn-Mower Attachments, of which the following is a specification.

My invention relates to improvements in lawn mower attachments, the present invention being an improvement on the construction shown in my pending application, Serial No. 595,454, filed December 3rd, 1910.

The object of this invention is the production of a device of the character mentioned which will be so constructed as to be adapted to serve the purpose for which it is designed with greater facility than the device shown and described in the application above referred to.

Other objects will appear hereinafter.

With these objects in view my invention consists in a lawn mower attachment characterized as above mentioned and in certain details of construction and arrangement of parts all as will be hereinafter fully described and more particularly pointed out in the appended claims.

My invention will be best understood by reference to the accompanying drawings forming a part of this specification and in which—

Figure 1:
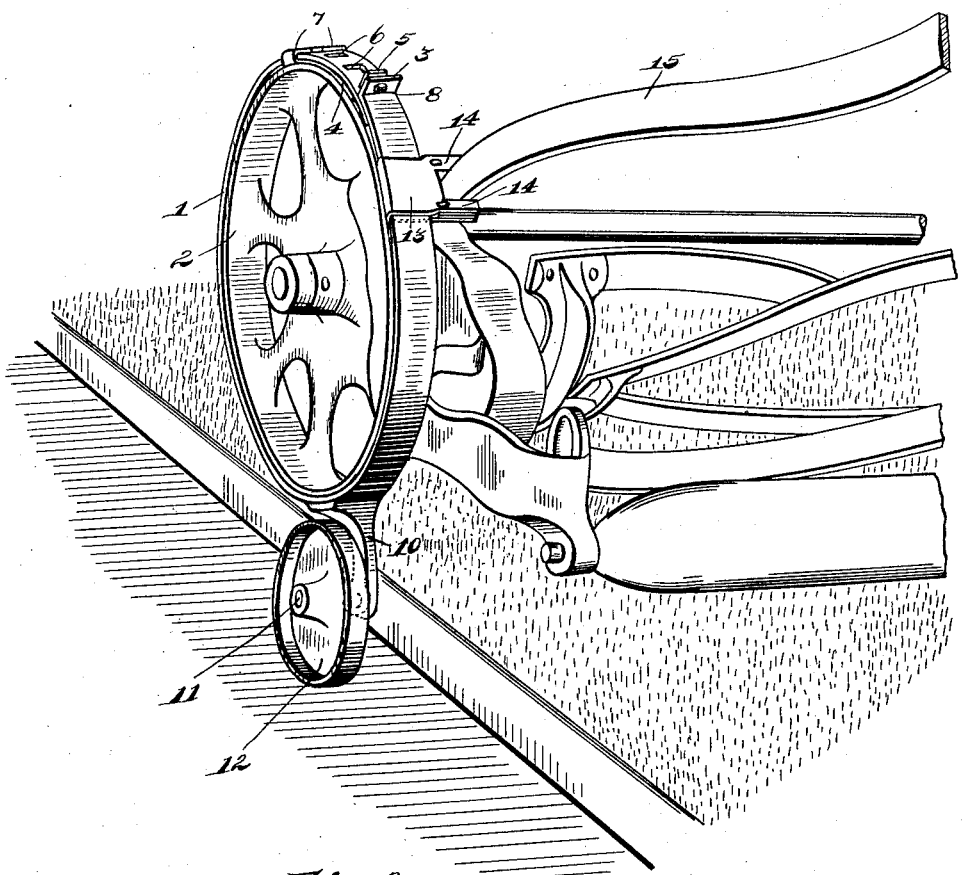
Figure 2:
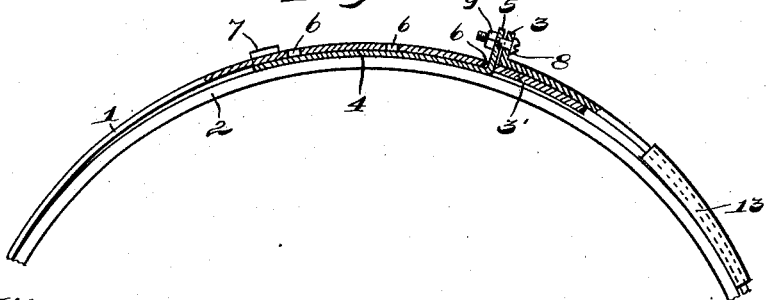

Figure 1 is a fragmentary perspective view of the lower end portion of a lawn mower to which is applied an attachment embodying my invention, and Fig. 2 is an enlarged detail of the attaching band included in the construction, the same being shown partially in section.

The preferred form of my construction as illustrated in the drawing comprises a metallic band 1 which is adapted for arrangement upon the periphery of either of the traction wheels 2 of the lawn mower as clearly shown in Fig. 1. One of the extremities 3 of the band 1 is bent outwardly at substantially right angles to the body thereof, the other end 3' of said band being positioned under the first mentioned end thereof in overlapping relation therewith as clearly shown in Fig. 2. Slidably mounted upon the end 3' of the band 1 is a plate 4 formed at one extremity with an outwardly projecting ear 5 which is adapted to engage and project through either of the plurality of spaced slots 6 formed in said end of said band. Formed at the opposite end of the plate 4 are ears 7 which are turned to slidably embrace the band 1 in order to maintain the plate 4 in proper position thereon. The end 3 of the band 1 and the ear 5 of the plate 4 are provided with slots in alinement with each other slotted for the reception of a connecting screw 8, said screw together with the nut 9 threaded thereon serving, as will be clearly understood, to secure the band 1 rigidly in position upon the wheel. With this arrangement tightening or loosening of the band upon said wheel may be effected by simply rotating said bolt or nut as desired. By providing a plurality of slots 6 for engagement by the ear 5 provision is made, which permits of the band being adjusted for employment upon lawn mower wheels of various sizes as will be readily understood.

Carried by the band 1 intermediate its extremities is a radially projecting arm or bracket 10 in which is carried a laterally projecting journal 11. Mounted upon the journal 11 is a supplemental wheel 12 which is adapted to contact the ground instead of the wheel 2 so as to effect elevation of the latter to properly position the cutting blades relative to the lawn which is being cut. Slidably adjustable upon the band 1 is a sleeve or loop 13 from the inner side of which project integral fingers 14 forming a substantially U-shape inner end portion upon said sleeve. Said fingers 14 are adapted to engage the adjacent side of the lawn mower bail 15 in order to lock the band 1 and hence the wheel engaged thereby against relative rotation; the engaging member 13 being locked in position simultaneously with the tightening of the band about the wheel since the latter operation effects clamping of the under side of the member 13 between the band and the periphery of the wheel. In order to adjust the member 13 upon the band 1, with this construction, it is only necessary to loosen the screw 8 or the nut 9 since loosening of the band upon the wheel simultaneously effects release of said engaging member.

By providing an attachment of the construction as set forth to an ordinary lawn mower the latter will be adapted for use in cutting the grass at the edge of the lawn, since with the employment of the attachment the outer wheel of the lawn mower will be supported by the supplemental wheel at such a height that the blades of the lawn mower will be positioned to cut the grass as in ordinary operation of the mower. To vary the height at which the wheel 2 is supported, it is only necessary to rock the handle of the lawn mower and hence the bail 15 with which the handle is connected, since by so doing wheel 2 bearing the attachment will be accordingly rocked and hence the wheel 12 moved to effect the result desired.

A lawn mower attachment of the construction set forth is durable and economical in construction and the same is so designed as to be adapted for attachment to lawn mowers having wheels of various sizes.

While I have illustrated and described the preferred form for carrying my invention into effect, this is capable of variation and modification without departing from the spirit of the invention. I therefore do not wish to be limited to the precise details of construction as set forth, but desire to avail myself of such variations and modifications as come within the scope of the appended claims.

Having described my invention what I claim as new and desire to secure by Letters Patent is:

1. The combination with a lawn mower comprising traction wheels and a bail, of a band secured to the periphery of one of said wheels; a supplemental wheel carried by said band; and an engaging member carried by said band and adjustable thereon for connecting said bail with said wheel to prevent rotation of the latter, substantially as described.

2. The combination with a lawn mower comprising traction wheels and a bail, of a band adjustably secured to the periphery of one of said wheels; a supplemental wheel secured to said band; and a slotted engaging member slidably adjustable upon said band adapted to engage said bail for connecting said bail with said wheel to prevent rotation of the latter, substantially as described.

3. The combination with a lawn mower comprising traction wheels and a bail, of a band adjustably secured to the periphery of one of said wheels; a supplemental wheel carried by said band; and a substantially U-shaped engaging member having a loop-formed base portion slidably embracing said band, said engaging member being adapted to engage said bail for connecting said bail with said wheel to prevent rotation of the latter, substantially as described.

4. The combination with a lawn mower comprising traction wheels and a bail, of a band adjustably secured to the periphery of one of said wheels; a supplemental wheel carried by said band; and a substantially U-shaped connecting member having a loop-formed base portion slidably embracing said band whereby when said band is tightened on said wheel said engaging member will be simultaneously clamped in position, said engaging member being adapted to engage said bail for connecting said bail with said wheel to prevent rotation of the latter, substantially as described.

5. The combination with a lawn mower comprising traction wheels and a bail, of a band encircling one of said wheels, one end of said band being bent outwardly; an outwardly projecting ear adjustably mounted upon the other end of said band and adapted to engage in any one of a plurality of spaced slots provided in said end of said band; connecting means engaging said outwardly projecting band end and said ear for tightening said band about said wheel; and a sleeve slidably mounted upon said band and having inwardly projecting flanges adapted to engage against opposite sides of said bail for connecting said bail with said wheel to prevent rotation of the latter, substantially as described.

In testimony whereof I have signed my name to this specification in the presence of two subscribing witnesses.

AXEL G. TULANE.

Witnesses:
 HELEN F. LILLIS,
 JOSHUA R. H. POTTS.